(12) United States Patent
de Bellefeuille et al.

(10) Patent No.: US 6,512,968 B1
(45) Date of Patent: *Jan. 28, 2003

(54) COMPUTERIZED AUTOMOTIVE SERVICE SYSTEM

(75) Inventors: Jean de Bellefeuille, Brunswick, ME (US); John C. Brennan, Carrigrohane (IE); Alan David Casby, Conway; George Michael Gill, Vilonia, both of AR (US); Patrick O'Mahoney, Cork City (IE); Gary L. Sandusky, Prosper, TX (US); Ju Zheng, Little Rock, AR (US)

(73) Assignee: Snap-On Technologies, Inc., Lincolnshire, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,618

(22) Filed: Oct. 31, 1997

Related U.S. Application Data

(63) Continuation-in-part of application No. 08/857,725, filed on May 16, 1997, now Pat. No. 6,285,932.

(51) Int. Cl.[7] .............................................. G06F 19/00
(52) U.S. Cl. .............................. 701/33; 701/29; 701/35
(58) Field of Search .............................. 701/29, 33, 35; 395/702, 703; 709/302, 303; 707/103, 203

(56) References Cited

U.S. PATENT DOCUMENTS

| | | | | |
|---|---|---|---|---|
| 4,258,421 A | * | 3/1981 | Juhasz et al. ................. | 701/35 |
| 4,381,548 A | | 4/1983 | Grossman et al. ............ | 701/29 |
| 4,404,639 A | | 9/1983 | McGuire et al. ............. | 364/551 |
| 4,718,759 A | | 1/1988 | Butler ................... | 356/139.09 |

(List continued on next page.)

FOREIGN PATENT DOCUMENTS

| | | |
|---|---|---|
| EP | 0644501 A1 | 3/1995 |
| EP | 067865 A1 | 11/1995 |
| EP | 0754940 A2 | 1/1997 |
| EP | 0754940 A3 | 10/1998 |
| GB | 2305818 A | 4/1997 |

OTHER PUBLICATIONS

1.) Williams, Al, *Developing Active Web Controls*, Chapters 1 and 6–9. Coriolis Group Books, 1996.
2.) Hipson, Peter D., "Installing Your Applications Under Windows 95," *Proceedings of the International Developers Conference For Windows, Book III*, Chapter F1; Jun. 16, 1995.
3.) Beveridge et al., *Multithreading Applications in Win32: The Complete Guide To Threads*, Chapters 1, 10, and 14; Dec. 1996.
4.) Punders, Mark, *Installshield5: Getting Started Guide*. Installshield Software Corporation, 1997.
5.) Norton, Daniel A., *Writing Windows Device Drivers*, Chapters 1 and 7–10; 1992.

(List continued on next page.)

*Primary Examiner*—Tan Nguyen
(74) *Attorney, Agent, or Firm*—McDermott, Will & Emery

(57) ABSTRACT

An improved computerized automotive service equipment system has a number of novel features. The system causes the initiation of a servicing routine upon the detection of particular stimuli from the sensors. The novel system also places instructional output on the output device simultaneously with an output representative of a vehicle diagnostic state. Object oriented programming techniques are utilized to allow an automotive servicing application to be easily and conveniently updated. The automotive service equipment system is constructed so that replacement of the sensor hardware only requires the replacement of a single software object or collection of objects instead of the rewriting of the entire application. In the novel system, the operator/technician can program the sequence in which the automotive service routine will proceed. The system has other novel features as well.

12 Claims, 5 Drawing Sheets

U.S. PATENT DOCUMENTS

| | | | |
|---|---|---|---|
| 4,922,443 A | | 5/1990 | Coetsier et al. .............. 702/188 |
| 4,931,964 A | | 6/1990 | Titsworth et al. ............ 700/279 |
| 4,977,524 A | | 12/1990 | Strege et al. .................. 33/203 |
| 5,138,548 A | * | 8/1992 | Kienle ......................... 395/425 |
| 5,157,610 A | | 10/1992 | Asano et al. .................. 701/32 |
| 5,165,177 A | | 11/1992 | Kercheck ................. 33/203.18 |
| 5,208,646 A | * | 5/1993 | Rogers et al. ............... 356/152 |
| 5,305,455 A | | 4/1994 | Anschuetz et al. ......... 709/100 |
| 5,506,772 A | | 4/1996 | Kubozono et al. ............ 701/29 |
| 5,528,496 A | | 6/1996 | Brauer et al. .................. 701/32 |
| 5,541,840 A | | 7/1996 | Gurne et al. ................... 701/33 |
| 5,557,525 A | * | 9/1996 | Miichi et al. .................. 701/29 |
| 5,598,357 A | * | 1/1997 | Colarelli, III et al. ...... 364/559 |
| 5,602,733 A | | 2/1997 | Rogers et al. ................. 701/29 |
| 5,671,141 A | | 9/1997 | Smith et al. ................... 701/29 |
| 5,713,075 A | | 1/1998 | Threadgill et al. ........... 455/427 |
| 5,717,595 A | * | 2/1998 | Cherrington et al. .... 364/464.1 |
| 5,732,074 A | | 3/1998 | Spaur et al. ................. 370/313 |
| 5,748,301 A | * | 5/1998 | Muller et al. ................ 356/155 |
| 5,774,361 A | * | 6/1998 | Colarelli, III et al. ......... 701/29 |
| 5,909,379 A | * | 1/1999 | Dale, Jr. et al. ............ 364/578 |
| 5,918,051 A | * | 6/1999 | Savitzky et al. ............. 395/638 |
| 5,919,238 A | * | 6/1999 | Lavey ........... 701/29 .......... |

OTHER PUBLICATIONS

6.) *Help–To–HTML Converter: User's Guide.* Blue Sky Software Corporation, 1996.

7.) Hall, Dr. Bill, "Win32 Internationalization" and Hall et al ., "Working with Japanese and Other Far East Languages," *Proceedings of the International Developers Confedrence For Windows, Book I,* Chapter M3; Jun. 12, 1995.

8.) Oney, Walter, "Why Port to Win32?"; Freytag, Ausmus, "How to Implement a Multilingual User Interface"; Richter, Jeffrey, "Processes and Threads"; and Freytag, Ausmus, "Setting Up an International Software Project," *Proceedings of the International Developers Conference For Windows, Book II,* Chapters T1, T18, and W6, respectively; Jun. 13–14, 1995.

9.) Rumbaugh et al., *Object–Oriented Modeling and Design,* Chapters 13–17. Prentice Hall, 1991.

10.) Kano, Nadine, *Developing lnternational Software for Windows95 and Windows NT: A Handbook for International Software Design,* Chapters 1–4. Microsoft Press, 1995.

11.) Blaszcak, Mike, *The Revolutionary Guide to Win32 Programming Using Visual C++,* Chapters 3, 4, 7 and 9; 1995.

* cited by examiner

COMPUTERIZED AUTOMOTIVE SERVICE SYSTEM

RELATED APPLICATIONS

This application is a continuation-in-part of copending application Ser. No. 08/857,725 filed May 16, 1997 now U.S. Pat. No. 6,285,932, assigned to the assignee herein, and is related to an application entitled, "System and Method for Distributed Computer Automotive Service Equipment," filed Oct. 31,1997, Ser. No. 08/962,023, also assigned to the assignee herein, both of which are hereby incorporated by reference.

FIELD OF THE INVENTION

The present invention relates to a system and method for an improved computer automotive service equipment system.

BACKGROUND OF THE INVENTION

Computerized automotive service and diagnostic equipment systems for measuring or testing various parameters and for providing maintenance or repair procedure instructions to an operator are generally known. Such systems utilize a central control processor residing within a data input computer, and various data input and storage means are connected to that computer, for example, vehicle mounted instruments sensors, manual data input keyboards and electronic database storage media.

Systems that utilize vehicle mounted sensors utilize those sensors to transmit raw signals representing measured quantities to a central control processor for comparison with stored specification data. From this comparison, the central processor computes a vehicle diagnostic state. In addition to providing input or measured data, such sensors also enable the central processor to conduct live real-time monitoring of the vehicle diagnostic state. Representative vehicle wheel alignment systems are disclosed in U.S. Pat. Nos. 4,383,370 and 5,208,646, whose teachings and disclosures are hereby incorporated by reference.

In operation, the measured data derived from the raw signals (or alternatively measured data derived from operator keyboard input) is compared to pre-stored specification parameters. Such specification parameters correspond to specific makes and models of vehicles or parts. A vehicle diagnostic state is obtained from the aforementioned comparison between measured and specification values, and the central processor provides an output perceptible by the operator on an output device. Such output devices usually comprise a CRT display, but many possibilities are evident, for instance sound or voice output or a paper hardcopy printout. From the information on the output device, an operator may thereby diagnose problems with the vehicle or part under inspection. In automotive service equipment in general, such as engine analyzers, brake testers, suspension testers, wheel balancers and the like, sensors are not necessarily vehicle mounted.

In addition to diagnostic procedures, existing systems allow operators to perform corrections once problems are detected from the vehicle diagnostic state output. Such systems can include step-by-step adjustment or repair procedure instructions to assist in such corrections. In such cases, the output functions to guide an operator or technician through a repair or adjustment procedure.

Various shortcomings exist among currently known systems of the type described above. For one thing, such computerized automotive service equipment usually comprises proprietary, closed computer systems. A manufacturer of such systems typically spends years developing software. The manufacturer has to customize the software to run on a single dedicated computer, and the resulting product has little or no flexibility to interchange and update different hardware and software elements. Each system runs different software, often on completely different operating systems designed for completely different hardware platforms. Each individual system also is incapable of being conveniently or easily updated. If a new development or improvement occurs, the manufacturer of the individual system typically has to issue an entirely new version release of the software and/or hardware in order to bring that improvement to market. The new release requires a complete rewrite. Not only do new versions often take years to complete. It is often so costly to release a new system that, as a practical matter, the manufacturer has to wait until enough improvements occur in order to justify the financial burdens of a new version release. This hampers the ability of the end user, the automotive service professional, to bring the latest technological improvements to the customer, the typical car driver.

In some instances, personal computers (PC's) have been implemented in automotive service applications in an attempt to overcome the aforementioned problems. For instance, some vehicle wheel alignment systems have been implemented that use standard IBM-based PC's in combination with the MICROSOFT WINDOWS 3.1 operating system. While such systems do represent a departure from the traditional monolithic closed systems of the past, a number of disadvantages remain. For instance, on a programming level, WINDOWS 3.1 does not support 32-bit addressing; it only supports 16-bit addressing using a 16-bit segmented addressing mode. This memory model is an idiosyncratic remnant of the old DOS 16-bit segmented addressing mode. Also, WINDOWS 3.1 uses only a primitive form of multitasking. WINDOWS 3.1 multitasking is process-based. That is, while multiple programs can run at the same time on the system, the operating system cannot run multiple parts of the same program at one time. One consequence of this is that it has previously been impossible to place videographic computer animation (for instance, an instructional video) on a display screen at the same time as the real-time live sensor readings are displayed. It has also not been possible to utilize particular sensor inputs as a prompt to initiate and execute portions of an automotive service application while the rest of the automotive service application continues to execute at the same time.

While in some fields it has been appreciated to overcome the limitations of a WINDOWS 3.1 based computer system with the implementation of newer 32-bit operating systems, such as WINDOWS 95, the same cannot be said of the automotive service equipment field. The WINDOWS 95 operating system utilizes 32-bit flat addressing. Furthermore, WINDOWS 95 utilizes not only process-based multitasking, but also thread based multitasking. Thread based multitasking allows several parts of the same program to run at the same time. All of the pertinent advances of WINDOWS 95 over the WINDOWS 3.1 operating system are being retained in the newer WINDOWS 98 operating system, and ought to remain through future versions as well. It would be advantageous to apply such features to the automotive service equipment field.

FIG. 1 is a stylized schematic showing a general overview of how an application interacts with the computer hardware in a WINDOWS 95 or WINDOWS NT operating system. Here, the kernal interface to the hardware is represented by a series of rings. Ring 0 is the hardware, or the core. For instance, this might include the CPU, video card, serial ports, et cetera. In Ring 1 resides the WINDOWS operating system kernal and virtual device drivers. Virtual device drivers are software objects that contain code which understands how to communicate with the underlying hardware. The WINDOWS kernal handles all calls and passing of information back and forth between the operating system and the various application programming interfaces (API's). Ring 2 is where all WINDOWS application programming interfaces (API's) reside and execute. Ring 3 is where all old DOS applications execute. In Ring 2 also resides self contained reusable software objects, called "DLL's." A DLL ("Dynamic Link Library") is a small computer program that may be shared by many different processes at the same time.

Other features of 32-bit operating systems such as WINDOWS 95 have heretofore been unappreciated in the automotive service equipment arts. WINDOWS 95 supports enhanced object oriented programming and object oriented design ("OOP/OOD"). OOP involves the creation of software "objects." Software objects may be thought of as self-contained mini-programs within a program. Before OOP, programs primarily consisted of two basic elements, data and program instructions. Data elements are storage locations. Program instructions are commands the computer will follow to make decisions or manipulate data. A data element such as a variable, constant or structure had only one function—to hold information. Instructions had only one function—to perform some action. With the advent of software objects, the line between data and instructions becomes fuzzy. Objects are software entities that have properties. They can take action, like instructions, but also utilize data. One of the main virtues of software objects is their inherent reusability. Objects, being largely self-contained, may be purchased that perform many commonplace functions, such as database routines, mathematical algorithms, and input/output functions. Microsoft has now developed a WINDOWS NT version and a WINDOWS 98 version that can share hardware drivers across the different platforms. Many objects are included with the Microsoft Visual C/C++4.2 Developers Studio, an integrated software development environment for writing object oriented programs.

Object oriented applications are generally easier to create and modify than non-object oriented applications. If a portion of an application must be changed, all that is necessary is to change the particular software object in question. The modification will be transparent to the rest of the application. This is in contrast to prior systems in which an entire application had to be rewritten and debugged whenever a minor change was made to a single part of the application. Object oriented programs also do not have to reside completely on one computer. As long as the object can be accessed, the computer running the main application routine will be able to call the object and operate on it.

One consequence of the failure to utilize OOP in automotive service equipment applications is that it was heretofore impossible for an automotive service technician to create and customize his own sequential servicing routine on the shop floor. In other words, while in prior systems, a technician could select which servicing procedure to perform from a selection of menu options (random mode), he could not program a unique sequence of servicing routines that would make the computerized system take him through the same set of routines, step by step, each time (sequential mode).

SUMMARY OF THE INVENTION

In accordance with the object of the invention to overcome the disadvantages and limitations of the prior art as described above, the present invention provides a novel improved computerized automotive service equipment system.

In one embodiment, the computer causes the initiation of a servicing routine upon the detection of particular stimuli from the sensors. For instance, a runout correction procedure will be initiated upon the sensors detecting the initiation of the procedure at the vehicle wheel. In another embodiment, the novel system places instructional output on the output device simultaneously with an output representative of a vehicle diagnostic state. In yet a further embodiment, object oriented programming techniques are utilized to allow an automotive servicing application to be easily and conveniently updated. In a still further embodiment, an automotive service equipment system is provided in which the replacement of the sensor hardware only requires the replacement of a single software object or collection of objects instead of the rewriting of the entire application. In yet a further embodiment, a system is provided that enables the operator/technician to program the sequence in which the automotive service routine will proceed. Other features of the present inventions will be apparent to one of skill in the art from the detailed description below.

DETAILED DESCRIPTION OF THE PREFERRED EMBODIMENTS

The detailed descriptions of the following preferred embodiments are meant to be descriptive of the best mode for practicing the present inventions, and are not intended to limit the rights granted herein, which rights are defined by the appended claims.

Figure 1:
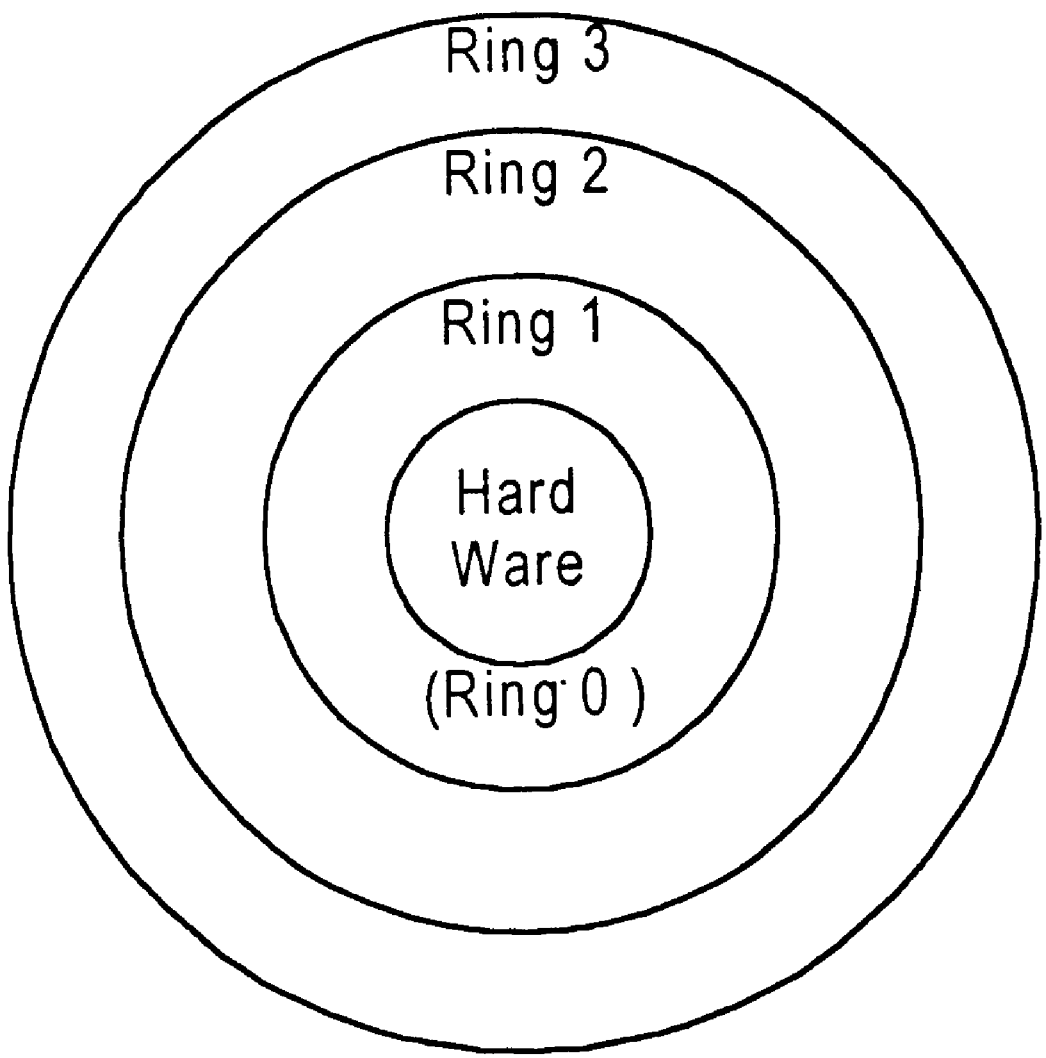
FIG. 1 is a stylized schematic showing a general overview of how an application interacts with the computer hardware in a WINDOWS 95 or WINDOWS NT operating system.
Figure 2:
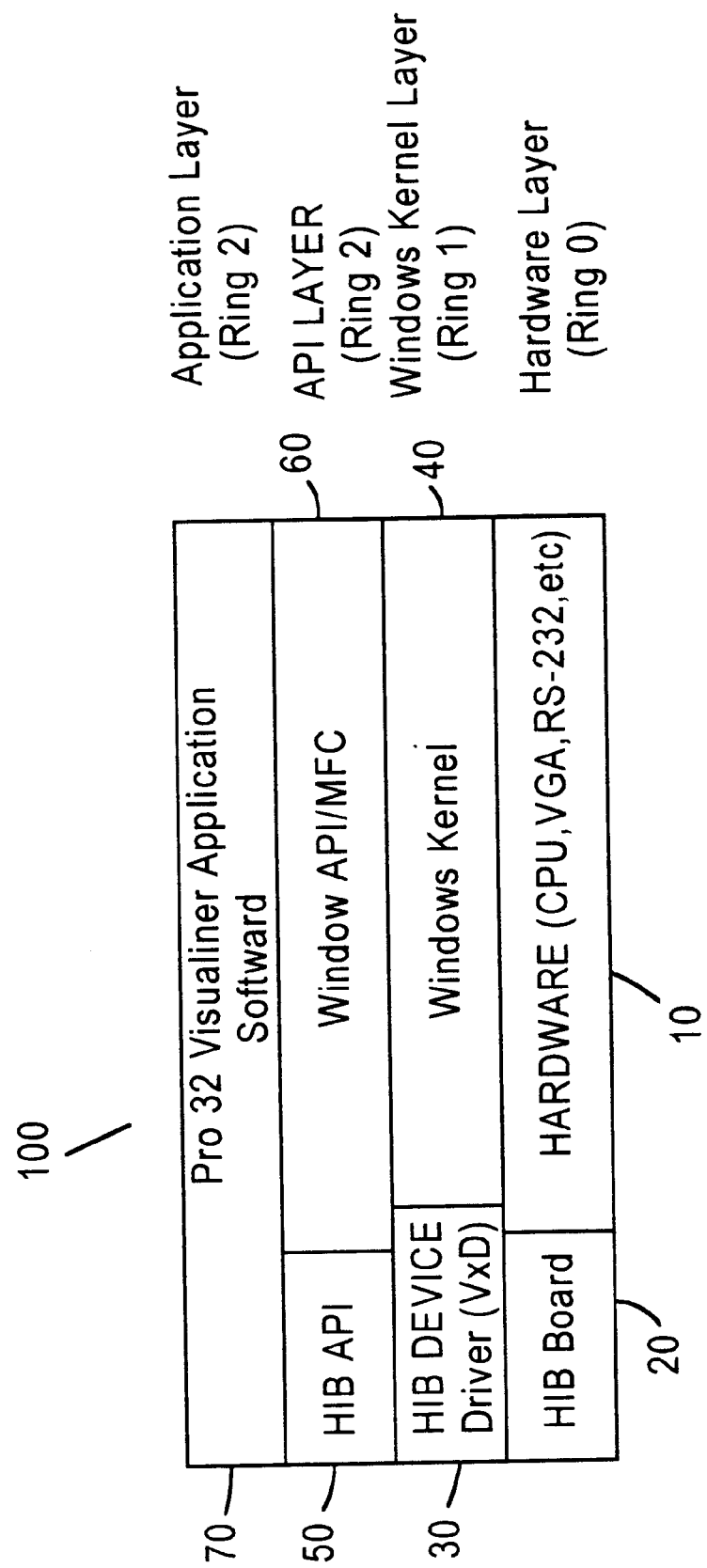
FIG. 2 is a stylized schematic showing a general overview of how the system of the present invention interacts with the computer hardware of the present invention.

FIG. 2 is a stylized schematic showing a general overview of how the automotive service equipment system of the present invention interacts with the computer hardware of the present invention. While the discussion herein is specific to a vehicle wheel aligner system, those of skill in the art will recognize that the same principles will apply to an automotive service equipment system of the general type.

The vehicle wheel aligner system 100 comprises the hardware and software necessary to conduct vehicle wheel alignment procedures. The software operates on a 32-bit operating system, such as WINDOWS 95, WINDOWS 98, WINDOWS NT, or any equivalent operating system. The hardware 10 comprises an IBM compatible personal computer of the general type containing a microprocessor adapted to run the 32-bit operating system, such as an Intel PENTIUM based system. Hardware 10 additionally comprises an appropriate display adapter (such as a VGA card), a serial port such as an RS-232 port, and other I/O interface boards commonly found in PC's. Hardware 10 resides in Ring 0.

In a preferred embodiment, the CPU in hardware 10 will be associated with a BIOS that supports bootable CD-ROMS. In this way, the operating system can be placed on CD on power-up. This eliminates any need to boot the operating system from a PROM, which is expensive, on systems that do not have another bootable media such as a hard disk drive. Also, this eliminates the need to replace existing hard-wired PROMS when upgrading becomes necessary.

Also in Ring 0 is another I/O interface board specific to vehicle wheel aligner applications, known simply as a hardware interface board (HIB) 20. HIB 20 in the vehicle wheel aligner application is the hardware that is operatively coupled between the collection of wheel-mounted alignment sensor heads and the computer. HIB 20 functions to pass raw vehicle wheel alignment signals from the sensor heads, and convey them to the CPU.

Uniquely associated with HIB 20 are HIB device driver 30 and HIB API 50. HIB device driver 30 and HIB API 50 are a self contained software objects that take the raw vehicle wheel alignment signals from the CPU, and process them into alignment angle signals that are capable of being interpreted upstream by an application. HIB device driver 30 is a software object of the VxD type, signifying a virtual device driver. While the VxD type is the driver format specified for the WINDOWS 95 operating system, any appropriate driver type may be used as needed, such as those specified for WINDOWS 98 or WINDOWS NT operating systems. HIB API 50 is also a self-contained software object, but one that uses the DLL format. HIB device driver 30 resides in Ring 1, whereas HIB API resides in Ring 2 of the general system.

HIB device driver 30 and HIB API 50 cooperate with HIB 20 in the following way to make transparent the specific type of hardware that is used in a particular automotive service equipment system. Each HIB device driver 30 and API 50 is uniquely associated with each unique HIB 20. Consequently, different sensing or I/O hardware may be used on the same automotive service equipment system. An operator only has to make sure that the appropriate HIB device driver 30 and the appropriate HIB API for the particular HIB 20 is present on the system. The application itself is unaffected. For example, while one brand of sensor heads for a vehicle wheel alignment application might require a first type of HIB device driver 30 and HIB API 50 to communicate vehicle wheel angle signals to a vehicle wheel alignment application, a second brand of sensor heads will require a second type of HIB device driver and HIB API. Changing the HIB 20, HIB device driver 30 and HIB API 50 will be transparent to the underlying system application, since the same processed alignment angle signals are designed to be output by the HIB API 50 into the application no matter what HIB 20 is used. Further, it will be appreciated that HIB device driver 30 and HIB API 50 may physically reside within the alignment sensor heads themselves, such as when those sensor heads are adapted to communicate over a network to the CPU in hardware 10.

Also present in the vehicle wheel alignment system 100 is a Windows kernal 40, which resides in Ring 1, the Windows kernal layer. Windows kernal 40 is the low level operating system that causes the CPU to communicate with (i.e., send "messages" to) the various executing applications and the parts thereof. Windows kernal 40 causes the time sliced, preemptive CPU operation that guarantees that each executing application will communicate with the operating system during an individual operating system cycle. This preemptive approach to kernal processing is one of the means by which multitasking is performed. As shown, HIB device driver 30 resides in the same ring as Windows kernal 40, which signifies that HIB device driver 30, when present, receives the attention of the CPU at least once during each cycle of the Windows kernal 40. Windows kernal 40 also supports the 32-bit Windows graphical user interface metrics. It also utilizes a DCOM OLE 2.0 container and/or object server to allow the user to drag objects between the Windows kernal 40 and other Windows applications. Windows kernal 40 further supports the Universal Naming Convention (UNC), which comprises paths allowing logical connections to network devices without the need to specifically reference a network drive letter, thereby enabling easy file access across network connections.

Windows API/MFC 60 is in the next higher layer in vehicle wheel aligner system 100. It comprises a collection of self-contained software objects of the 32-bit DLL format. These DLL's allow multiple applications to use the same procedure. Because of the object oriented nature of the system, porting to other platforms (i.e., UNIX, XENIX, MacOS, et cetera) may be accomplished in a practical manner. Preferably, Windows API/MFC 60 comprises the Microsoft Foundation Classes software library. Windows API/MFC 60 also preferably comprises a set of self-contained software objects that are generated uniquely for automotive service equipment systems. These include, for example, objects representative of discrete functions to be performed by an application. Examples include vehicle owner information, vehicle wheel alignment specifications, diagnostic computational routines, automotive service equipment operator instruction routines, customer account information, or any object that might be of some use as a data or instructional subset of an automotive service equipment system. Since they are objects, each of these structures residing in Windows API/MFC 60 may be conveniently updated, such as when new vehicle wheel alignment specifications are released, or when customer information changes. As objects, they can also be used by different processes on the same computer simultaneously. They also have the property that they are device independent, since they will receive the same data communication protocol from the Ring 1 drivers regardless of which hardware devices reside on the system. As objects, they have flexibility beyond mere data storage. For instance, vehicle specifications may be cross referenced any number of ways when they exist as an object. In addition to the current "make-year-model"cross referencing, objects allow specifications to be accessed by make-year range-model; by make-year-model-submodel; by make-year range-model-submodel, et cetera.

It should be noted that some of these objects, e.g., vehicle specifications, customer information, et cetera, are data access objects, specifically designed to be used as databases. Data access objects and collections provide a framework for using code to create and manipulate components of the database system. Objects and collections have properties that describe the characteristics of database components and methods that are used to manipulate them. Together these objects and collections form a hierarchical model of the database structure that is controlled through the various programs.

Microsoft Foundation Classes (MFC) supports two different kinds of database access: access via Data Access Objects (DAO) and the Microsoft Jet database engine, and access via Open Database Connectivity (ODBC) and an ODBC driver. Both of these supply abstractions that simplify working with databases, complete with the speed, power and flexibility of C++. Both integrate the data access work with the MFC application framework.

It is preferred to use ODBC classes when working strictly with ODBC data sources, particularly in client/server situations. It is preferred to use the DAO classes when working primarily with Microsoft Jet (.MDB) databases or with other database formats that the Microsoft Jet database engine can read directly. DAO usually allows a richer data access model because of its support for Data Definition Language (DDL) as well as Data Manipulation Language (DML).

Finally, application software 70, which in the preferred vehicle wheel aligner system 100 will be known as the Pro32 Visualiner Application, also resides in Ring 2. But unlike HIB API 50 or Windows API/MFC 60, application software 70 is the set of main application routines that call and operate on the objects in Ring 2. Application software 70 is the high level set of routines that sends messages back and forth to the Windows kernal 40 during each kernal cycle. Application software 70 is that layer of programming that performs the functions that are most visible to the operator. Because of the multitasking capabilities of the WINDOWS 95 32-bit operating system, the Windows kernal 60 can execute application software 70 at the same time that it executes any other software process residing in Ring 2.

Similarly, the Windows kernal 60 can execute different parts of application software 70 (i.e., different threads) at one time. The present invention utilizes multitasking in the form of multiple processes and multithreaded code. A process is an executing application that consists of a private virtual address space, code, data and other operating system resources, such as files, pipes and synchronization objects that are visible to the process. A process contains one or more threads that run in the context of the process. A thread is the basic entity to which the operating system allocates CPU time. A thread can execute any part of the application code, including a part simultaneously being executed by another thread. All threads of a process share the virtual address space, global variable and operating system resources of the process. This mechanism creates the effect of simultaneous execution of various parts of the program. The applications are object-oriented and event driven. The multitasking techniques manage multiple activities such as simultaneous sensor communications, user inputs, data manipulations, program state management, and complex visual controls. The advantage of this technique is to handle multiple inputs concurrently providing real time instrumentation. The programs are more efficient and faster by distributing tasks among multiple threads for independent processing.

The application software 70 of the preferred embodiments are programmed to support the WIN32 application programming interface (API). This is in the form of an executable file generated with a 32-bit application generator (compiler) which generates an executable file of the Portable Executable format. The Microsoft Visual C++compiler (version 2.0 or later), Microsoft's Visual Basic, Borland Delphi and other 32-bit application generators can be used. The vehicle service systems of the present invention utilize Microsoft Foundation Classes (MFC) to reduce development time. These classes provide easier implementation of the graphical user interface (GUI), data access, and general operating system interfaces. By using these pre-programmed controls less human effort is required to produce a well-functioning and marketable vehicle service system. Time from design to market is reduced as well. The use of object oriented programming hence enhances the ability of the software to be maintained and extended.

In one vehicle wheel aligner embodiment, application software 70 comprises a routine that monitors the signals being generated by the sensor heads. When the application software 70 detects a change in the steering angle of at least one steerable wheel through the sensor heads and associated hardware and driver software, application software 70 generates a new thread that executes a caster measurement. This caster measurement thread executes simultaneously with the underlying main routine running in application software 70.

In another vehicle wheel aligner embodiment, application software 70 comprises a routine that monitors these signals, wherein application software 70 generates a new thread that executes a runout compensation routine upon the detection in the rotation of a vehicle wheel about its axis or when the user pushes a button on the sensor head to initiate the runout compensation procedure. This runout compensation procedure executes simultaneously with the underlying main routine running in application software 70. The aforementioned threads (caster measurement and runout compensation) appear to the operator as "popup" screens on a vehicle wheel aligner display.

In another embodiment of the present invention, application software 70 comprises a routine to compute real-time output signals on the display, for instance graphic gauges showing real-time vehicle angle measurements as compared to associated vehicle wheel alignment specification values. In this embodiment, application software 70 also executes a thread that comprises a computer animated videographic instruction showing and guiding the operator in how to perform a particular alignment procedure to correct any deviation of the vehicle wheel alignment measurements. Such computer animation can comprise computer graphics, or actual video or film footage, pre-recorded or live. If live, the video footage might, for instance, use an Internet video streaming application comprising ActiveX controls. With a 32-bit operating system, the use of a 1024×768 (and greater) pixel display array that incorporates 16-bit and/or 24-bit (True Type) colors is enabled. Such capabilities enable sharper looking graphics and more legible symbolic font sets, such as those needed to represent Asian language characters.

In a still further embodiment, the application software 70 comprises a routine that enables an operator to establish the sequence in which computerized vehicle service procedures are performed. In prior art applications, operators were limited in how they conducted the automotive service equipment procedure to one of two ways. In one prior art system, the computer program required an operator to go through an immutable procedure that was performed in the same sequence each time. For instance, in vehicle wheel alignment applications, runout compensation might be performed first, followed by toe angle adjustment, followed by caster swing measurements, and so on. This had the disadvantage of not being alterable as a service technician's needs changed. In the other prior art system, the operator was presented with menu options (random mode), and the operator would select one or more of those options as needed. This had the disadvantage of making automotive service procedures confusing to technicians who were not properly trained, and making those procedures daunting as the list of menu options multiplied.

Figure 3:
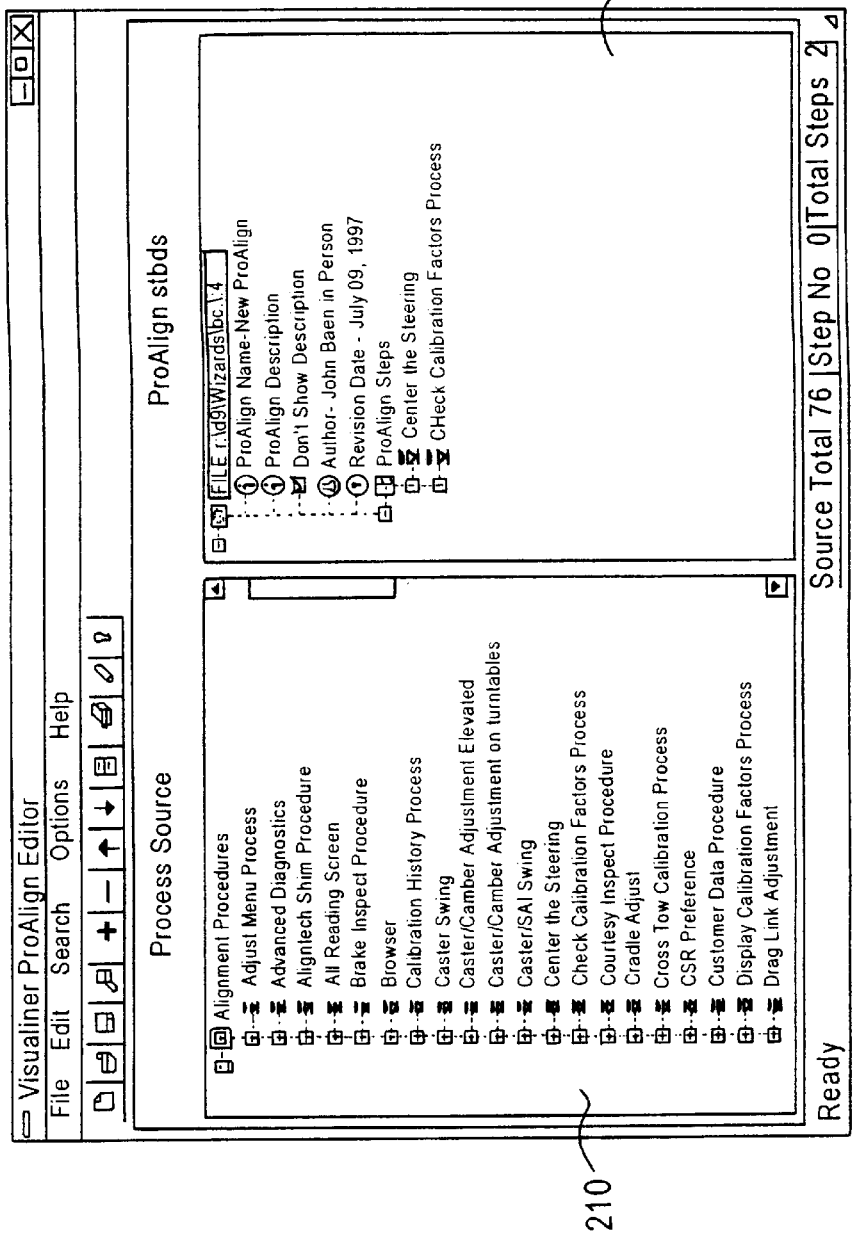
FIG. 3 is a representative screen display of the sequential automotive servicing procedure editor of the present invention.

The sequence selection of the present invention overcomes these disadvantages. FIG. 3 shows a representative screen display 200 of the sequential automotive servicing procedure editor of the present invention. Screen display 200 comprises a process source window 210 and a process sequence destination window 220.

In operation, the process source window 210 comprises a collection of discrete automotive service equipment procedures. These procedures may simultaneously comprise vehicle wheel alignment procedures, engine analysis procedures, brake testing procedures, or any collection of discrete procedures that the particular computer hardware and software of the system is adapted to perform. An operator constructs whatever sequence is necessary in process sequence destination window 220, starting with a first vehicle service procedure step, repeating the selection of steps until the entire desired sequence of steps is selected, and then indicating to the system that the sequence is complete. In FIG. 3, process sequence destination window 220 shows the steps of first centering the steering, and then the check calibration factors process. This sequence is stored as an object in the Windows API/MFC 60. The sequence is then accessed by application software 70, which uses the sequence object to initiate the routines comprising an object or objects representative of the centering the steering procedure, and the check calibration factors process.

Figure 4:
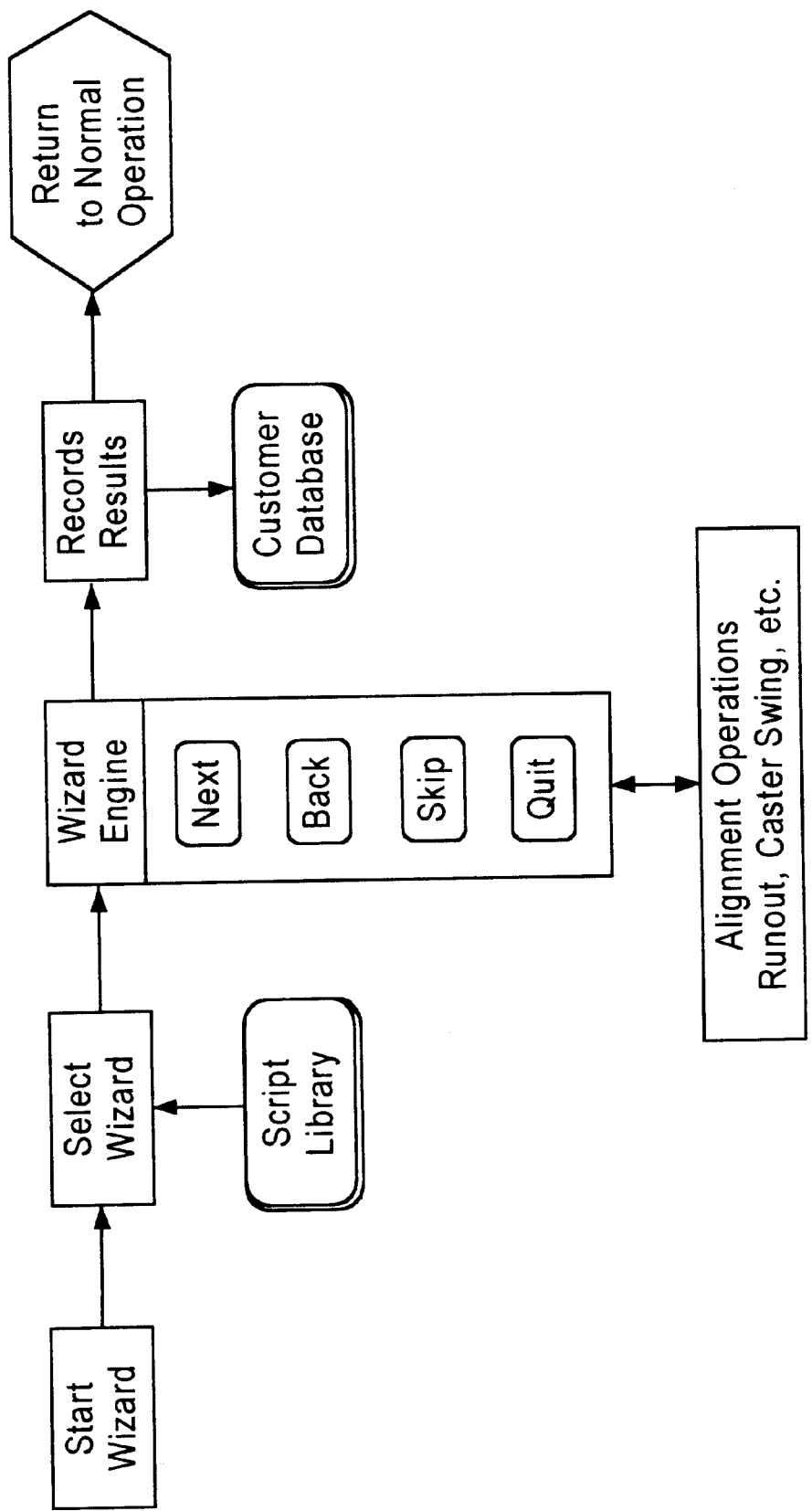
FIG. 4 shows a flow diagram of a generalized sequenced process control of the present invention.

FIG. 4 shows a flow diagram of a generalized sequenced process control. As shown in FIG. 4, the sequenced process control is denoted a "Wizard," which for present purposes should be taken as synonymous with "sequenced process control." A Wizard corresponds to a unique object or script file containing an operator preprogrammed automotive service sequence. First the user starts the Wizard mode, which is a thread within software application 70. Next, an operator selects the particular Wizard desired for execution. A script library is presented to the operator on a display, and the operator chooses one from the library. Then software application 70 initiates the Wizard engine thread, which is a control program that makes sure that the proper sequence is performed according to the selected script. Standard Windows controls are used to navigate the Wizard, including Next, Back, Skip and Quit buttons. Once all steps in a sequence are completed, software application 70 records the results, and preferably stores them in a customer database that may comprise multiple objects, each one representative of an individual customer. Once this task is finished, the main software application 70 routine takes over.

This sequential editing capability combines the advantageous features of prior art automotive service equipment systems while eliminating the disadvantages. As with the prior art sequential mode, the operator may execute an automotive servicing sequence in the proper order without the need for special decision or expert training. And as with menu driven random mode systems, the operator may, when necessary, select the order in which the sequence occurs. This novel system also allows a service bay manager to create the processes and sequences that his or her automotive service technicians will carry out with a particular piece of equipment. In principle, the novel system also makes any single piece of properly programmed PC hardware able to perform any conceivable automotive service equipment function. This is especially advantageous for the small repair shop, which can now perform on one machine the servicing functions that heretofore required sometimes dozens of different expensive machines. Wizard procedures can be pre-selected, selected by preferences, selected by the operator, keyed to a particular vehicle, keyed to the operator, or any combination of the preceding. Once a Wizard mode is invoked, the steps are determined by the Wizard and the operator input for each step.

In another embodiment of the present invention, software application 70 comprises equipment security routines that can track the usage of the automotive equipment system. In one aspect, these security routines require a technician to log on and present a password prior to using the machine. In another aspect, the security routines track machine usage when the operator is logged on, and until he is logged off. The information gathered includes the identity of the operator, the time taken to perform a task, the particular tasks performed, and other productivity statistics. Various privilege levels are also used, so that equipment is only enabled to the extent that a user has access at the proper privilege level.

The installation and uninstallation features of the present automotive service equipment system and file integrity checking capability will now be explained.

WINDOWS 32-bit application software installation is sometimes complex. Among the complexities are the need for components such as DLLs and ActiveX controls to be registered in the operating directory. When multiple applications share resources like DLLs, the registry must be updated to show multiple resource usage so that when an application is deleted the resource is not removed. ActiveX controls used by the application must be registered in the registry. Means must be provided for the installer to be launched through the ADD/REMOVE program from the Windows Control Panel. When installing the software the user privilege level must be monitored. The installation processes can be simplified such that a non-skilled person can install vehicle service system software, as described below.

The system of the present invention uses an installer routine to install the software into the desired computer environment. The installer is a graphical setup program which automatically leads the user through the installation process. The installer copies all necessary files from the distribution media onto the desired computer's environment. The installer makes configuration changes, such as registry changes, automatically. The installer installs and registers all required components such as DLLs, ActiveX components, etc. The installer provides means for the software to be installed with the ADD/REMOVE program from within the WINDOWS Control Panel. The installer makes use of the operating system's registry to register installed components. The main advantage of the automated installer is that it allows users to self-install the system's software, rather than having an expert technician install the software.

The installer described herein executes in a 32-bit Microsoft WINDOWS environment and takes advantage of the CD-ROM autoplay features of WINDOWS 95, WINDOWS 98 and WINDOWS NT. When the distribution CD is placed in the CD-ROM drive, the installer routine is automatically prompted for execution. This is accomplished by placing the "AUTORUN.INF" file on the root directory of the CD, which has instructions to execute when the CD is inserted. The AUTORUN.INF file contains the following contents for automatically starting the setup routine.

[autorun]

open=setup

Implementation of the installer can be accomplished by programming in any language, as the program takes advantage of the operating system's application programming interface to accomplish these tasks. This would be time-consuming and would require extensive maintenance as each version of the software is released. A more efficient way to achieve the same effect is to use InstallShield Corporation's product INSTALLSHIELD, which visually guides a user through the setup process. The user selects files, DLLs, registry entries, etc. to be installed into the computer's environment. The tool kit then makes an image of the distribution media that is required for installation, which is copied on to the distribution media.

The systems of the present invention use a fully automatic uninstaller routine that removes program files, folders and registry entries from the installed environment, except for data files and resources used by other programs. The uninstaller also removes itself. The uninstaller enables an unskilled operator to remove the system's software without inadvertently removing the wrong files and thereby affecting the other WINDOWS applications.

Maintaining installed file integrity is accomplished by installing a file integrity check tool. Since software is installed on a hard disk drive, it is subject to damage by magnetic fields. The file integrity check software will make a record of the installed files consisting of file size, file date, file checksum (addition of all the bytes in the file), CRC (Cyclic Redundancy Check) and similar means of recording file characteristics. The record is saved on a target installation device and backed up on a removable media device. The file integrity check software will use the recorded information to check the integrity of each file. It can be run as a diagnostic tool whenever there is a problem with the installed software, each time the system is started, or any time it is desired.

Other features of the present invention will now be explained. Currently, vehicle wheel alignment systems allow an operator to calibrate the aligner to operate to operate on more than one alignment surface (i.e., rack). When an alignment is performed on a new surface, the operator merely shifts the designation within the application software so that the system will use the appropriate calibration factors. However, currently the alignment surfaces are assigned non-changeable names. This causes confusion about which alignment surface is assigned to each name.

A novel software application 70 is provided which comprises a software routine that allows an operator to assign a name to each alignment surface. Thus, users can associate different alignment surfaces with different easy to remember names. The naming system will lead to less confusion when the operator desires to switch between alignment surfaces. The alignment surface name is saved to and recalled from a non-volatile storage media such as a hard disk drive.

In another embodiment, software application 70 comprises a software routine that enables convenient powerless recovery. This is accomplished by continually or periodically saving newly gained data to a database. For instance, customer data, initial readings, final readings, and other key information is immediately saved to non-volatile memory. When the vehicle service equipment is powered up it reloads the latest saved data from the database. A new record is created in the database only when a new alignment is selected.

Figure 5:
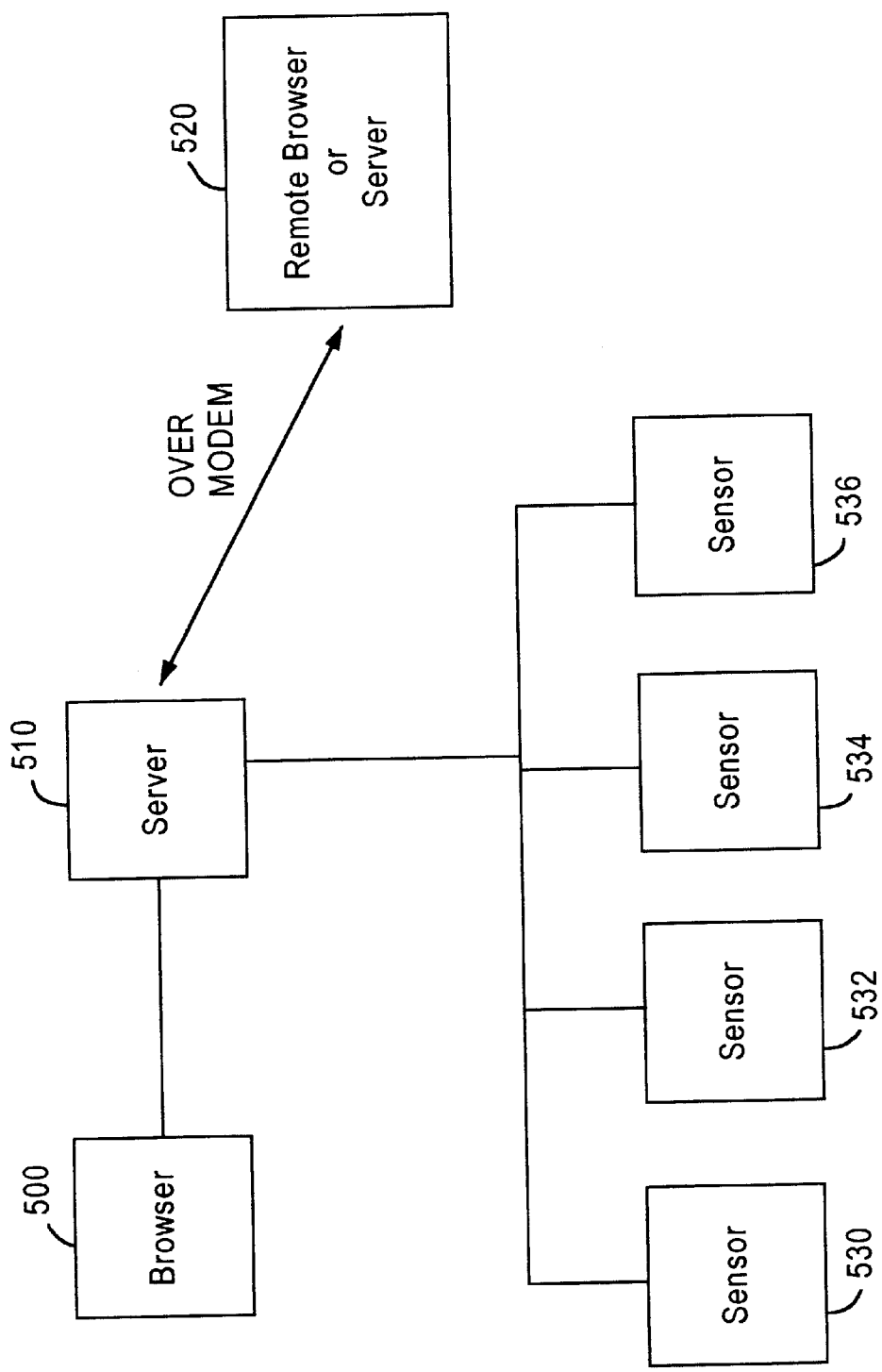
FIG. 5 shows a schematic block diagram of an embodiment of the present invention.

In the embodiment of FIG. 5, server 510 is an active server, preferably one with DCOM technologies, preferably ActiveX technologies. Server 510 has an area, or set of pages, dedicated to general customer data, vehicle type and vehicle diagnostic information. Another area is dedicated specifically to alignment procedures. In operation, browser 500 hosts ActiveX controls for functions requiring interaction or dynamic content, such as alignment meters for graphical display to an operator. Browser 500 also preferably hosts a Java Virtual Machine that is adapted to accept Java byte codes from server 510, and thereby provide computer animation on the browser 500 display using Java applets. These applets might comprise operator instructional information, and similar help files. Preferably, the sensors 530, 532, 534 and 536 communicate on a TCP/IP based shop network (Intranet) or are directly connected to the server 510 through a standard dedicated interface such as a serial communication port. Data from the alignment sensors is transmitted to server 510 via direct communication between ActiveX controls on the server and in the sensor subsystems. The ActiveX controls in server 510 processes the data through alignment algorithms that send the processed data to the ActiveX meters in browser 500 for display. It will be appreciated that the ActiveX controls are software objects constructed with OOP techniques and can be designed for reuse in other applications.

The system of FIG. 5 also supports a remote browser or server 520. Remote browser or server 520 is addressed over the Internet and has its own Internet TCP/IP address. Server 510 preferably comprises a modem to allow remote connection to remote browser or server 520 over a telephone line, for instance via a standard Internet service provider (ISP) connection. In this way, a Web browser or server 520 anywhere in the world can access the aligner system of FIG. 5. Remote browser or server 520 can even take the place of the finctionality provided by on-site browser 500. In other words, the alignment readings can be displayed on meters from within the remote Web browser or server 520. All of the foregoing connections, in the preferred embodiment, are carried out using the HTTP transmission protocol. In addition, while server 510 and remote browser or server 520 have been described as carrying ActiveX technologies, it is easily apparent to those of skill in the art that the system can be modified to incorporate a thin client, CGI and/or Java to perform the various network and data intensive tasks. It is equally apparent that any time a browser function is recited above, the same end result Can be accomplished using a thin client instead.

Although the best mode contemplated for carrying out the present invention hasbeen herein shown and described, it will be apparent that modification and variation may be made without departing from what is regarded to be the subject matter of the invention.

We claim:

1. In a computerized wheel alignment system comprising a plurality of alignment angle sensors adapted to sense wheel alignment angles, the alignment system further comprising a computer coupled to the plurality of sensors and adapted to receive therefrom signals indicative of the wheel alignment angles, a method for performing caster measurements, comprising the computer-implemented steps of:

executing a first software program to carry out the steps of:
monitoring the signals arriving at the computer;
detecting a change in the steering angle of at least one of the steerable wheels based on the monitored signals; and
launching a second software program to carry out a caster measurement procedure in response to said detecting the change in the steering angle of at least one of the steerable wheels.

2. The system of claim 1, wherein the step of launching a second software program to carry out a caster measurement procedure includes the step of generating a new thread to execute the caster measurement procedure.

3. In a computerized wheel alignment system comprising a plurality of alignment angle sensors adapted to sense wheel alignment angles, and a computer coupled to the plurality of sensors and adapted to receive therefrom signals indicative of the wheel alignment angles, a method for performing runout compensation, comprising the computer-implemented steps of:

executing a first software program to carry out the steps of:

monitoring the signals arriving at the computer;

detecting a signal from one of the plurality of alignment angle sensors representing an initiation of a runout compensation procedure; and launching a second software program to carry out a runout compensation procedure in response to said detecting the signal.

4. The system of claim 3, wherein the step of launching a second software program to carry out a runout compensation procedure includes the step of generating a new thread on the computer to execute the runout compensation procedure.

5. In a computerized wheel alignment system comprising a plurality of sensors adapted to sense wheel characteristics, and a computer configured for coupling to the plurality of sensors and receiving signals indicative of wheel characteristics therefrom, a method for performing runout compensation, comprising the computer-implemented steps of:

executing a first software program to carry out the steps of:

monitoring wheel activities of at least one of the wheels;

detecting a signal from one of the plurality of sensors representing rotation of at least one of the wheels about an axis; and launching a second software program to carry out a runout compensation procedure in response to said detecting of the signal.

6. In a computerized wheel alignment system comprising a plurality of sensors adapted to sense wheel characteristics, and a computer configured for coupling to the plurality of sensors and receiving signals indicative of wheel characteristics therefrom, a method for performing caster measurements, comprising the computer-implemented steps of:

executing a first software program to carry out the steps of:

monitoring the signals arriving at the computer;

detecting a signal from one of the plurality of sensors representing an initiation of a caster measurement procedure; and launching a second software program to carry out the caster measurement procedure in response to the detecting the signal.

7. In an automotive service system comprising a plurality of sensors configured for detecting vehicle characteristics, and a computer coupled to the plurality of sensors and adapted to receive signals indicative of vehicle characteristics therefrom, a method for performing automotive services, comprising the computer-implemented steps of:

executing a first software program to carry out the steps of:

monitoring the signals indicative of vehicle characteristics;

detecting a specific stimulus in the signals; and launching a second software program, in response to the detecting of the stimulus, to carry out an automotive service procedure.

8. A vehicle wheel alignment system comprising:

plurality of alignment angle sensors adapted to be mounted on vehicle wheels to sense wheel alignment angles, a computer adapted to execute a wheel alignment software application, a plurality of hardware interface boards, each of the plurality of hardware interface boards disposed between one of the plurality of alignment angle sensors and the computer and operatively coupled to pass raw alignment angle signals therebetween, an operating system residing on the computer and comprising a self-contained software object unique to the plurality of hardware interface boards, the self-contained software object adapted to convert raw alignment angle signals from the plurality of hardware interface boards into processed alignment angle signals capable of being interpreted by the wheel alignment software application, whereby the wheel alignment software application is configured to receive processed alignment angle signals from a second plurality of sensors upon the replacement of the plurality of hardware interface boards and the self-contained software object with a second plurality of hardware interface boards and a second self-contained software object.

9. The system of claim 8, wherein the second plurality of hardware interface boards are configured to pass different raw alignment angle signals from those of the plurality of hardware interface boards, and wherein the second self-contained software object is configured to convert the different raw alignment angle signals into the same processed alignment angle signals.

10. The system of claim 8 wherein the self-contained software object comprises a virtual device driver and wherein the second self-contained software object comprises a second virtual device driver.

11. The system of claim 8 wherein the plurality of alignment angle sensors each comprises one of the plurality of hardware interface boards.

12. The system of claim 11 wherein the plurality of alignment angle sensors each further comprises the self-contained software object.

\* \* \* \* \*